United States Patent [19]

Arrowood et al.

[11] Patent Number: 4,827,411

[45] Date of Patent: May 2, 1989

[54] METHOD OF MAINTAINING A TOPOLOGY DATABASE

[75] Inventors: Andrew H. Arrowood, Raleigh, N.C.; Alan E. Baratz, Chappaqua, N.Y.; Philip F. Chimento, Jr., Durham, John E. Drake, Jr., Pittsboro, John L. Eisenbies, Raleigh, James P. Gray, Chapel Hill, Karla J. Norsworthy, Raleigh, Diane P. Pozefsky, Chapel Hill, all of N.C.

[73] Assignee: International Business Machines Corporation, Armonk, N.Y.

[21] Appl. No.: 62,272

[22] Filed: Jun. 15, 1987

[51] Int. Cl.⁴ ............................................. G06F 15/16
[52] U.S. Cl. .................................... 364/300; 364/200; 364/282.1
[58] Field of Search ................... 364/200, 300; 370/94; 340/825.52

[56] References Cited

U.S. PATENT DOCUMENTS 4,644,532  2/1987  George et al. ...................... 370/94

Primary Examiner—Raulfe B. Zache
Attorney, Agent, or Firm—Gerald R. Woods

[57] ABSTRACT

Each network node in a communications network maintains its own copy of the network topology database defining network resources. Each resource record contains a "timer" field which is initially set to a maximum value but which may be decremented on a daily basis. If the timer field is decremented to zero without being reset, the node unilaterally removes the resource record from its copy of the database. The timer field will normally reach zero only for obsolete resource records since each network node responsible for a resource broadcasts a timer-resetting message for the resource (1) each time the resource status changes, (2) when the node first joins or rejoins the network, and (3) on a periodic (weekly) basis regardless of whether conditions (1) or (2) have occurred.

4 Claims, 8 Drawing Sheets

EN—END NODE
NN—NETWORK NODE

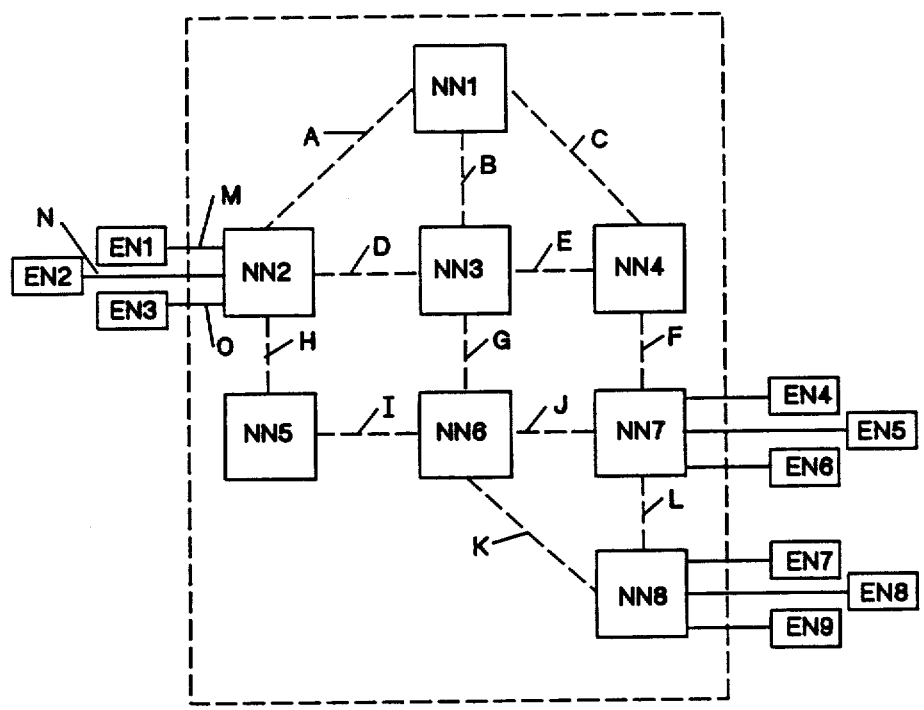
FIG. 1
EN-END NODE
NN-NETWORK NODE
FIG. 7
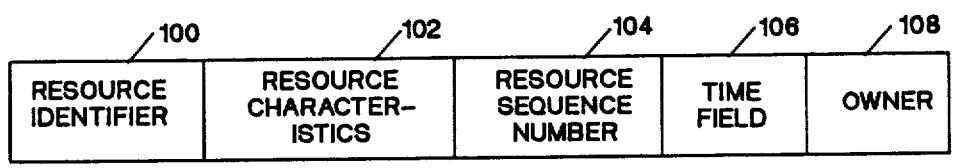

METHOD OF MAINTAINING A TOPOLOGY DATABASE

FIELD OF THE INVENTION

The present invention relates to communications networks and more particularly to a method of maintaining a common network topology database at different nodes in such networks.

For purposes of the following descriptions, a communications network can be generally defined as a collection of network nodes and end nodes interconnected through communications links or transmission groups. A network node can be characterized as a data processing system that provides certain functions within the network, such as routing of messages between itself and its adjacent or neighboring nodes, selection of routes for messages to be transmitted between a network node and an end node and the furnishing of directory services to connected end nodes. The links between nodes may be permanent communication links such as conventional cable connections or links that are enabled only when needed, such as dial-up telephone connections. End nodes are exemplified by devices such as display terminals, intelligent workstations, printers and the like which do not provide routing or route selection or directory services to other nodes in the network. Collectively, the network nodes, the end nodes and the transmission groups between the nodes are referred to as network resources. The physical configuration and characteristics of the various nodes and links in a network are said to be the topology of the network.

Before a message can be transmitted between any two nodes in any network, a human operator or data processing equipment responsible for establishing the connections must have an accurate and up-to-date file or database on the network topology. Without such a database, an attempt to establish a connection may be doomed because the operator or equipment may unknowingly include non-existent nodes or inoperative links in the connection path.

Maintaining a complete, current topology database was not a major problem in early communications networks. Early networks were relatively simple with node to node communications being managed by a single processor or a relatively small number of processors.

The fact that control of communications was largely centralized made it feasible for a system operator to maintain a current topology database for the entire network. The single system operator could add resources to the topology database, change the status of current resources or delete resources no longer available in the network due to temporary failure or permanent physical removal from the network. Once the single system operator had constructed a current topology database, copies of that database could be transmitted to any processor in the system having communications control functions.

Communications networks are becoming larger and more complex. Communications control functions are now performed by a greater number of processors distributed throughout a network.

It is no longer thought practical for a single system operator to maintain a current topology database for a complex network with distributed communications control functions. Because there are more resources in such networks, there will be more changes in the status of those resources for an operator to keep up with. The volume and complexity of the changes increases the changes of human error in maintaining the topology database.

It is also thought impractical to distribute the task of maintaining the tolopology database among several system operators at different nodes since that approach requires continued, careful coordination of inputs from operators who may be located at great distances and in considerably different time zones from one another. If the task of maintaining a topology database for the entire network is distributed among remote system operators, there is always a possibility that an error by one of the system operators will be cascaded with errors by other operators, leading to the creation of a grossly inaccurate topology database.

Reasonably successful attempts have been made to have the network equipment itself take over the task of maintaining a topology database without human intervention. Each processor performing a communication control function notifies other processors of changes in the status of its resources. The other processors use these topology update messages to amend or change their own copies of the topology network database.

There are some problems with this approach. For one thing, if a processor performing a communications control function fails or is taken out of service permanently, it may not be possible for that processor to notify other processors of the fact. Moreover, every topology database update message that is transmitted through the network represents a form of overhead which detracts from the network's availability to transmit user messages between different nodes of the network. There is also a possibility that certain types of messages, particularly those relating to the deletion or removal of a resource from a network, may circulate endlessly through the network in an infinitie loop. Obviously, an endlessly circulating message degrades performance of the network for productive purposes.

SUMMARY OF THE INVENTION

The present invention is a method of maintaining a network topology database which minimizes network overhead by allowing each node with a copy of the database to unilaterally delete apparently outdated resources. Each node in the network monitors messages received from other network nodes for updates about the status of resources elsewhere in the network. If a given network node does not receive an update message for a resource over a given period of time, that node unilaterlly removes the resource-defining record from its copy of the topology database. A decision to delete a network resource is not communicated to any other node in the network.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following technical description when read in conjunction with the accompanying drawings wherein:

FIG. 1 is a block diagram of a representative communications network within which the present invention may be practiced;

FIG. 7 depicts a resource record of the type stored in each copy of a topology database.

TECHNICAL DESCRIPTION

Figure 2A:
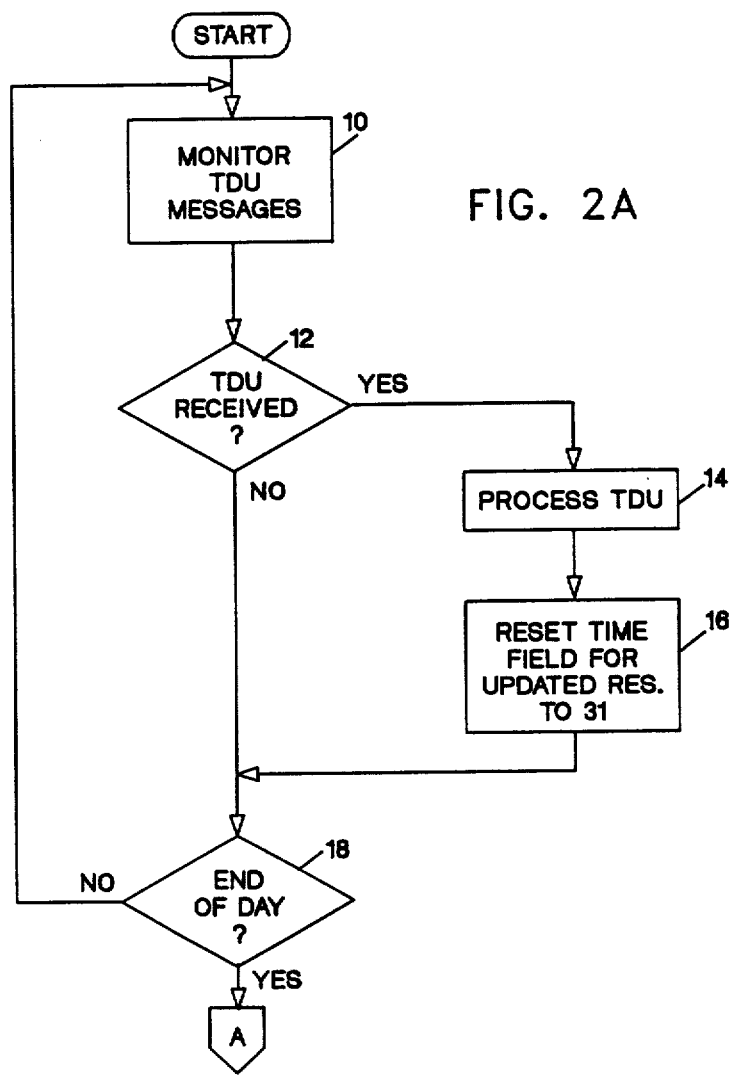
FIG. 2, consisting of FIGS. 2A and 2B, is a flow chart of the esssential steps performed at a network node in order to delete outdated resources from the copy of the network topology database maintained at that node.

FIG. 1 shows a representative communications network having eight network nods NN1 through NN8. Each of those nodes is linked to at least one other node through one or more communications links, such as links A through L. As mentioned earlier, each communications link may be either a permanent connection or a selectively enabled connection. Network nodes NN2, NN7 and NN8 are shown with attached end nodes EN1 through EN9. In practice, other network nodes might have attached end nodes. The network nodes NN1 through NN8 are data processing systems that provide certain communications services for their own end nodes and for other network nodes. The communications services provided by a network node include, among other things, the selection of communications routes between nodes, directory services and the maintenance of a network topology database, which the network node must have in order to determine the most appropriate route between nodes. The following technical description is concerned only with those functions that a network node performs in maintaining its copy of a network topology database.

Each network node maintains its own copy of the network topology database. This topology database is made up of a number of records each having the format shown in FIG. 7. Each record includes a network resource identifier field 100, a resource characteristics field 102, a resource sequence number field 104, a time field 106 and an "owner" field 108. The sequence number is used to assure that only current information about a resource is propagated through the network. The time field allows outdated resource entries to be deleted from the network topology database. The "owner" field defines the particular resource as one that either is "owned" by the local network node or as one that "belongs" to a remote network node. More details about the roles of the sequence number and the time field are provided below.

Table 1 is an example of a network topology database for the network shown in FIG. 1. A complete copy of this database is maintained at all of the network nodes. It can be seen from the table that the database includes each of the network nodes and each link associated with one of the network nodes. Each of the links in the network is defined in two different directions. For example, one record for link A defines that link as running from network node NN1 to NN2. The other record for link A defines that link as running from network node NN2 to NN1. The dual definition reflects the fact that the links are "owned" by different nodes, depending on the link direction used in setting up routes.

TABLE 1

Network Topology Database

| node NN1 | | | | | | |
|---|---|---|---|---|---|---|
| links A | NN1-NN2 | B | NN1-NN3 | C | NN1-NN4 |
| node NN2 | | | | | | |
| links A | NN2-NN1 | D | NN2-NN3 | H | NN2-NN5 |
| node NN3 | | | | | | |
| links B | NN3-NN1 | D | NN3-NN2 | E | NN3-NN4 |
| G | NN3-NN6 | | | | | |
| node NN4 | | | | | | |
| links C | NN4-NN1 | E | NN4-NN3 | F | NN4-NN7 |
| node NN5 | | | | | | |
| links H | NN5-NN2 | I | NN5-NN6 | | |
| node NN6 | | | | | | |
| links G | NN6-NN3 | I | NN6-NN5 | J | NN5-NN7 |
| K | NN6-NN8 | | | | | |
| node NN7 | | | | | | |
| links F | NN7-NN4 | J | NN7-NN6 | L | NN7-NN8 |
| node NN8 | | | | | | |
| links K | NN8-NN6 | L | NN8-NN7 | | |

Each network node also maintains a local topology database that identifies both the network resources "owned" by that network node and local links to connected end nodes. Local links are not considered to be part of the network topology. Table 2 is an example of a local topology database for network node 2. It will be noticed that Table 2 defines each communication link only once as extending from the network node to another network node or end node.

The local topology database is actually a subset of the network topology database, at least with respect to network resources. A single set of resource records exists at any network node. Each record contains the "owner" field, which defines that resource as belonging either to the network topology, to both the network and the local topology, or only to the local topology.

TABLE 2

| Local Topology Database (NN2) | |
|---|---|
| node NN2 | |
| links A | NN2-NN1 |
| D | NN2-NN3 |
| H | NN2-NN5 |
| M | NN2-EN1 |
| N | NN2-EN2 |
| O | NN2-EN3 |

The resource characteristics defined by the topology databases are those characteristics dealing with the use of the resource for communications purposes. Table 3 below is a set of representative characteristics for each of the network nodes. Because the names given each characteristics are largely self-explanatory and because the characteristics are being listed for illustrative purposes only and are not essential to an understanding of the present invention, there will be no detailed discussion of the characteristics. It should be noted that each characteristic is defined as being either static or dynamic and as having either a binary or a multiple value. A static resource is one that is not changed during network operation. A dynamic characteristic, on the other hand, may change during network operation. Where a characteristic is said to have a binary value, that means the characteristic either does or does not exist. For example, a binary value of 1 would be assigned to the intermediate routing function entry for a network node only if that node were capable of performing that function. Otherwise, a binary value of 0 would be assigned. Where the node characteristic may take on more than two values, the value type is referred to as a multiple value.

TABLE 3

| Node Characteristics | | |
|---|---|---|
| Characteristic | Static/ Dynamic | Binary/Multiple Value |
| central directory function | static | binary |
| intermediate routing func. | static | binary |
| congestion | dynamic | binary |
| intermediate routing resources depleted | dynamic | binary |
| quiescing | static | binary |
| node type | static | multiple |
| route addition resistance | static | multiple |

Table 4 shows the type of link characteristics which would be maintained in the topology databases. The link characteristics are used to establish communications between remote nodes in a way which minimizes communication costs while meeting other communications needs, such as the need for a particular level of security for a given communication.

TABLE 4

| Link Characteristics | | |
|---|---|---|
| Characteristic | Static/Dynamic | Binary/Multiple Value |
| cost per byte | static | multiple |
| cost per connect time | static | multiple |
| security level | static | multiple |
| modem class | static | multiple |
| effective capacity | static | multiple |
| propagation delay | either | multiple |
| quiescing | static | binary |
| operational | dynamic | binary |

Figure 2B:
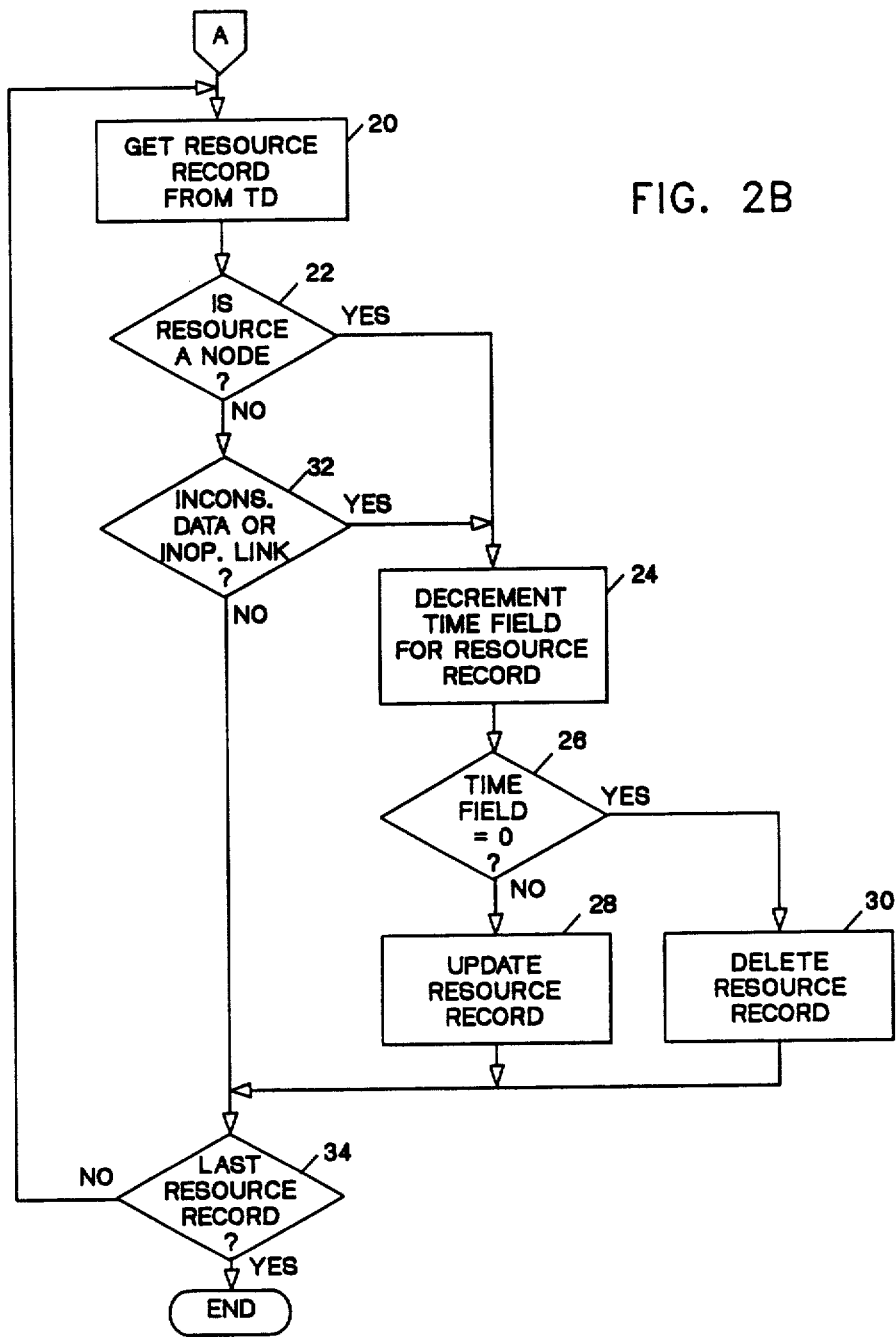

FIG. 2 is a flow chart of the process that allows a network node to determine when a remote network resource is obsolete and can be removed from its local copy of the topology database. Generally, the time field for every resource record in a local copy of the topology database will initially be set to a fixed maximum value. For purposes of illustration, the maximum value is taken at 31 or roughly one month. The network node will decrement the time field by one at the end of each day. If the time field is decremented to zero, the network node deletes the resource record from its local copy of the topology database. Normally, the time field will never reach zero for an active resource since the node owning that resource will periodically generate a topology database update (TDU) message and will broadcast that message to other network nodes. Any network node that receives a TDU message for an operative resource responds to that message by resetting the time field to 31. Therefore, the only condition under which a network node can unilaterally decide to delete an apparently-operative, remote resource from its local copy of the topology database is where no TDU message for that resource has been received for 31 straight days.

Referring specifically to FIG. 2, each network node performs the function 10 of monitoring incoming message traffic to determine whether that traffic contains TDU messages from other nodes. If decision block 12 indicates that a TDU message has been received, that message is processed in operation 14 and the time field for the resource record identified by the TDU is reset in block 16 to a value of 31. If no TDU messages have been received according to decision block 12, a check 18 is made to determine whether the end of the day has been reached. For purposes of this invention, the "end of the day" can occur at any time during a 24-hour period. If the end of day has not been reached, the system resumes other functions, including that of monitoring incoming traffic for TDU messages.

At the end of the day, however, the system performs the operation of updating the time field for each resource record in its topology database. A resource record is retrieved at block 20. If the retrieved record identifies a network node, as indicated by an affirmative response at decision block 22, the time field for the resource record is decremented by 1 at block 24 and a check 26 is made to determine whether the time field has been decremented to zero. If the time field is not equal to zero, operation 28 causes the resource record to be updated with the decremented time field value. If, however, decision block 26 shows a zero time field value, meaning that no TDU messages have been received concerning the node for thirty-one straight days, it is assumed that the node no longer is part of the network. The resource record for the node and for any communications links from the node are deleted from the topology database at block 30. The decision to delete the resource records from the topology database is made unilaterally by the processing node and is not communication to any other node in the network.

If decision block 22 had shown that the retrieved resource record did not identify a node, by definition that resource record must identify a link. An additional decision block 32 is involved in the process of updating resource records for links. Decision block 32 is a check to determine whether the resource record contains inconsistent link data or shows that the link is inoperative. If the record data is inconsistent or the link is inoperative, the time field value is decremented, the time field is compared to zero and the decision whether or not to delete the record is made in the same manner as is always done for a node resource record. If, however, decision block 32 shows neither inconsistent data or an inoperative link, the time field is not decremented. Decision block 32 and blocks 28 and 30 have a common termination at decision block 34, which is a check to determine whether the last resource record in the topology database has been retrieved during the end-of-day update routine database. If the last resource record has not been retrieved, the program loops back to the input of block 20 and the entire process is repeated for the next resource record in the topology database. If decision block 34 shows that the last resource record has been retrieved, the end-of-day update routine is exited.

To summarize the foregoing, each network node monitors incoming traffic for TDU messages about operative network resources. If a TDU message is received, the time field for the resource record in the local copy of the topology database is reset to 31. The time field is decremented for an inoperative or inconsistent link or any node. If the time field for any resource is decremented to zero, the resource record is deleted from the local copy of the topology database.

The preceding description deals with the consequences of receiving or not receiving a TDU message for a particular network resource at a network node.

There are three different situations under which a TDU message for a resource may be generated by a network node. A TDU message is produced and broadcast by the responsible node (1) each time the status of the resource changes, (2) when the node is first added to or reconnected to the network and (3) on a weekly basis regardless of whether conditions (1) and (2) have occurred during the preceding week.

Figure 3:
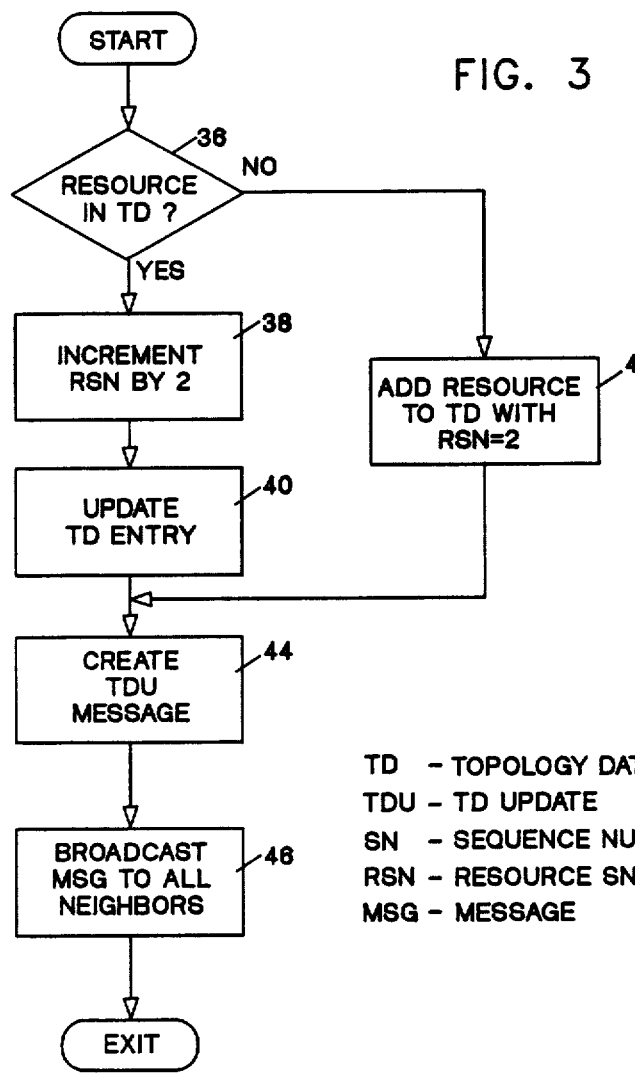
FIG. 3 is a flow chart of the steps performed at a network node upon a change in status of a resource "owned" by that node.

FIG. 3 is a flow chart of the operations that are preformed by a network node upon the addition of a resource to its local topology database or upon a change in status of an existing resource. The network node first decides at block 36 whether the local topology database already includes a record for the particular resource. If the resource has already been defined by the topology database, the resource sequence number or RSN for that resource entry is incremented by two at block 38 and the topology database record is updated at block 40. If decision block 36 shows there is no existing resource record in the topology database, a resource record is added to the database at block 42 with an RSN value of 2 being written into the record. The resource sequence number or RSN is a number which is used by a receiving network node in order to determine whether the topology database represents new information, old information nor information which is inconsistent with previously received information. The use of the RSN will be discussed later with reference to FIG. 6.

A TDU message, created by operation 44 for each new or changed resource, is broadcast in operation 46 to all network nodes which are neighbors (that is, connected directly to) to the originating node. The originating node then exits the routine.

Figure 4:
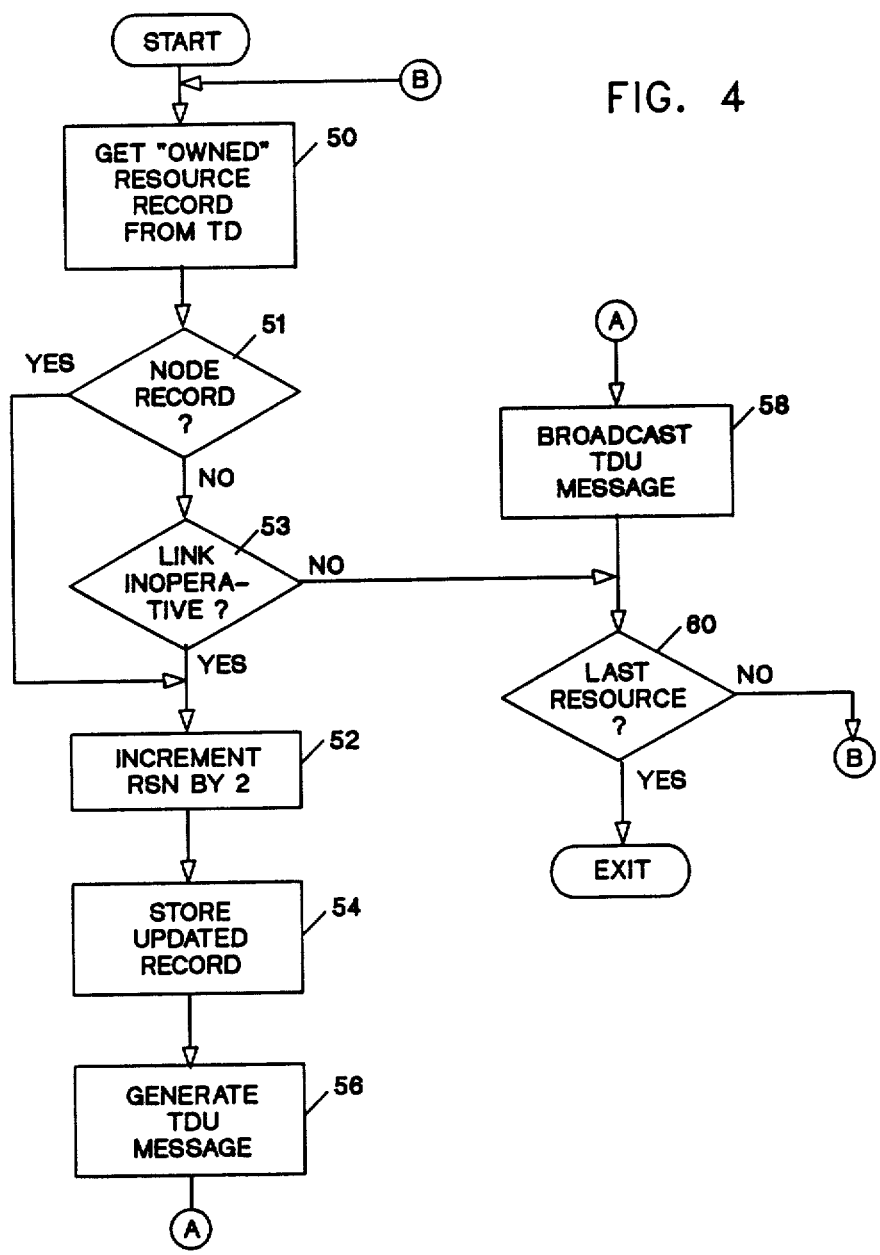
FIG. 4 is a flow chart of operations performed at a network node in producing a weekly broadcast of that node's network resources to other network nodes.

FIG. 4 is a flow chart of the steps performed in a network node on a periodic basis, for example once a week, to assure that regular TDU messages are generated about all "owned" resources. The network node retrieves a resource record from the topology database at block 50 and determines, at decision block 51, whether the record defines a node. If the record does define a node, the resource sequence number for the resource record is incremented by 2 at block 52. The updated node record is stored at block 54. A TDU message for the node is generated at block 56 and is broadcast to neighboring nodes in block 58. If decision block 51 indicates the record does not identify a node, the record necessarily identifies a link. A check 53 is made to determine if the link is defined as inoperative. If it is, the operations defined by blocks 52, 54, 56, 58 and 60 are performed for the link record. If, however, the link is defined as operative, the stored record remains unchanged and the link record is not included in any TDU message. If the originating node controls other resources, decision block 60 causes the program to loop through the described operations for each additional resource record. When the last resource record in the local topology database for the originating network node has been processed, the routine is exited. Thus, TDU messages are broadcast only for the node and any inoperative links "owned" by the node.

Figure 5:
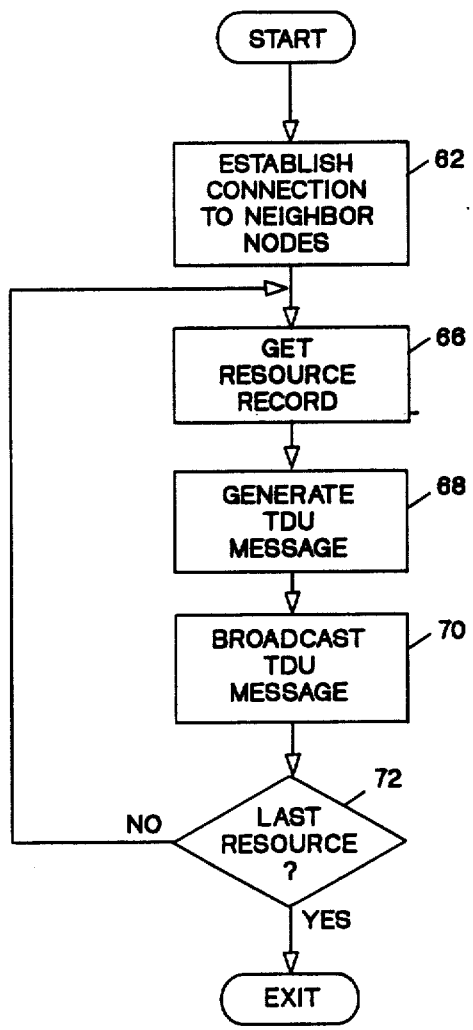
FIG. 5 is a flow chart of steps performed at a network node upon initial connection or reconnection to the network to advise other network nodes of the status of resources defined by topology database of the reconnecting node.

TDU messages are also generated by a network node the first time the node joins the network or each time the node rejoins the network after having been out of service for any reason. FIG. 5 is a flow chart of the operations performed at the network node under these conditions. Upon initially joining the network or rejoining the network, the originating node establishes a connection to neighboring nodes in block 62. A resource record is retrieved from the network topology database of the originating node in operation 66 and a TDU message for the resource is generated in operation 68. This message is transmitted (block 70) to the connected neighboring nodes. A check is then made in decision block 72 as to whether the topology database for the originating node contains additional resource records. If it does, the loop consisting of blocks 66, 68, 70 and 72 is repeated for each such resource record. Once the last resource record has been retrieved and, if appropriate, transmitted to the connected neighboring nodes, the sequence is exited.

Figure 6A:
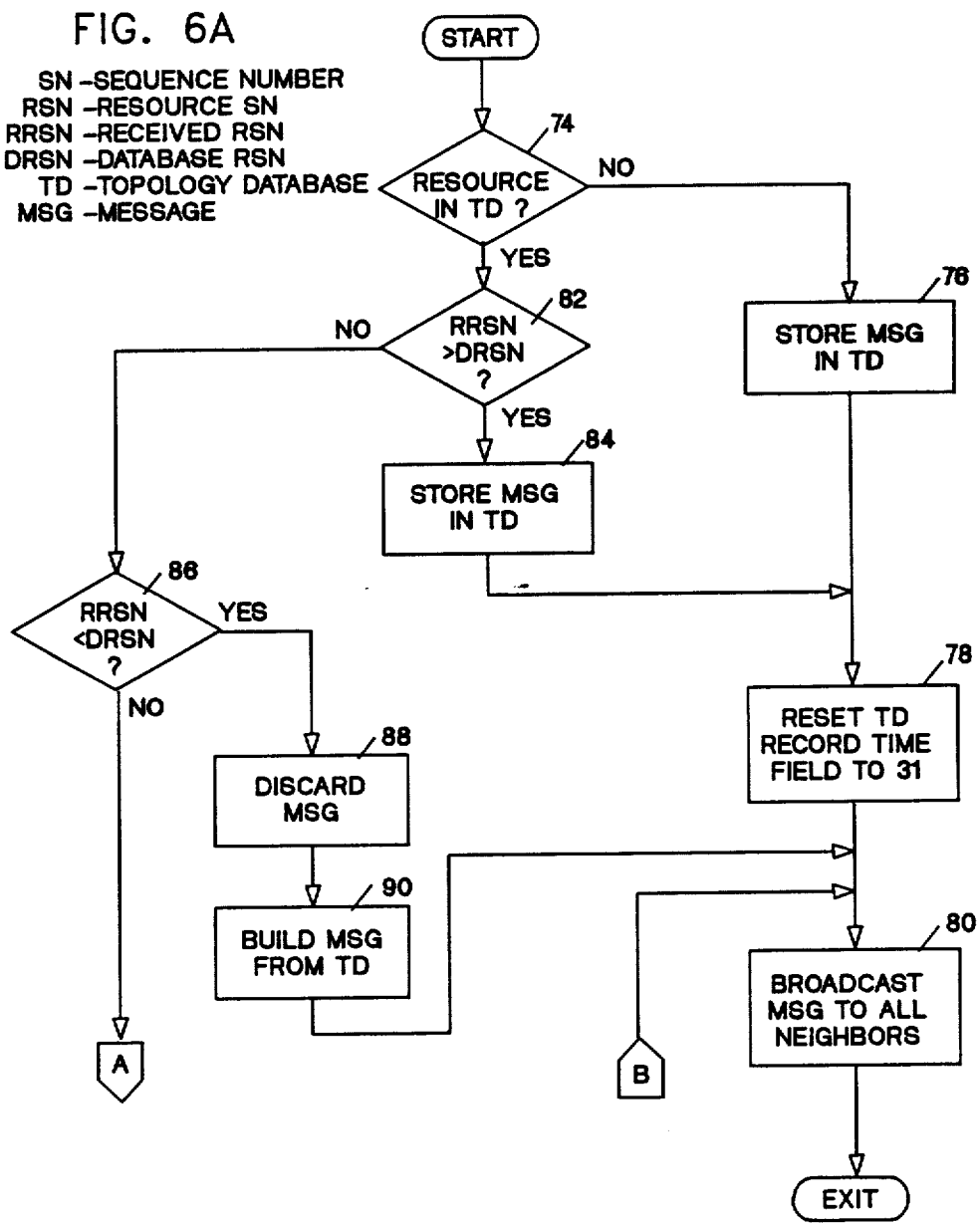
FIG. 6, consisting of FIGS. 6A and 6B taken together, is a flow chart of operations performed at any network node upon receiving a topology database update message from any other node.
Figure 6B:
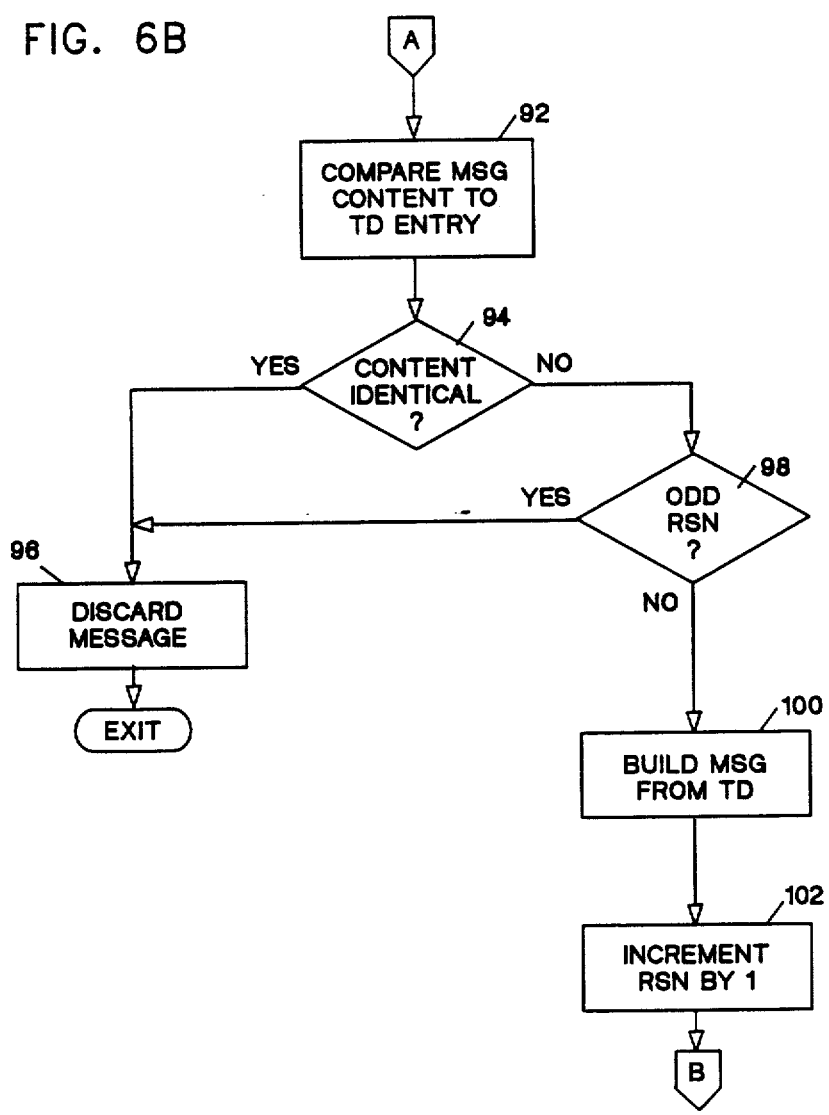

The foregoing description deals mainly with the manner in which TDU message can be generated at a network node and broadcast to other network nodes. Each network nodes must also be capable of processing TDU messages received from other nodes in order to maintain its own local copy of the topology database. FIG. 6 is a flow chart of the basic operations performed by a network node upon receiving a TDU message from another node. Upon receiving a TDU message from another network node, the receiving node first checks in block 74 to determine whether the TDU pertains to a resource for which a record already exists in the local copy of the topology database. If the TDU message pertains to a new resource, a resource record is created by block 76 and stored in the local copy of the topology database. The receiving node sets the time field for the topology database record to 31 in operation 78 and broadcasts the TDU message in operation 80 to neighboring nodes.

If decision block 74 indicates that the TDU message pertains to a resource already defined in the local copy of the topology database, the receiving node checks in operation 82 to determine whether the resource sequence number (RSN) in the received TDU message is greater than the RSN for the existing record in the local copy of the topology database. If the RSN value in the TDU message is greater, the message is stored in the local topology database in an operation 84 and, as before, the time field is reset to 31 before the TDU message is broadcast to all neighboring nodes other than the sending node.

If, however, decision block 82 shows that the RSN value in the TDU message was not greater than the RSN value in the topology database, another decision is made at decision block 86 as to whether the message RSN value is less than the RSN value already stored in the local copy of the topology database. If the stored RSN value is greater, it is assumed that the message has arrived over a delayed path. The received TDU mesage is discarded by operation 88 and a new TDU message is constructed in an operation 90 from information already contained in the receiving node's local copy of the topology database. The newly generated TDU message is broadcast to neighboring nodes.

If decision block 86 had shown that the received RSN value was not less than the stored RSN value, the received RSN value would necessarily be equal to the stored RSN value since decision block 82 already indicated that the received RSN value was not greater than the stored RSN value.

Where the received and stored RSN values are identical, the receiving node compares the contents of the TDU message to the contents of the local resource record in an operation 92. If the message contents and record contents are found to be identical by decision block 94, the TDU message is considered to be a duplicate and is discarded at block 96 before exiting the sequence. If decision block 94 reveals a mismatch between the message contents and the record contents a following decision block 98 determines whether the message RSN has an odd value. If the messsage RSN is odd, the message is treated as a duplicate and is discarded. If the message RSN is even, however, the receiving node builds a new TDU message in operation 100 using information already contained in its local copy of the topology database and increments the RSN value by 1 in an operation 102. Operation 80 is then performed on the newly constructed TDU message.

Because TDU messages are broadcast repeatedly by receiving nodes, it might seem as if such messages would circulate endlessly through the network. This is prevented by the operations 86, 92, 94 ad 96 described with reference to FIG. 6. If an originating node has transmitted a valid TDU message, that message may eventually return to a node which has already received it. A valid TDU message will have the same content as the stored resource record at such a node and will have an identical RSN value. Under those conditions, operation 96 will cause the message to be discarded without being broadcast further.

To briefly summarize the foregoing, each network node maintains its own copy of a network topology database. Each resource record in that local copy has a timer which is decremented daily unless a TDU message concerning the resource has been received from another network node. If the TDU message has been received, the timer is reset to its maximum value. If no TDU message is received before the timer decrements to zero, the node assumes the resource is out of date and removes it from its local copy of the network topology database. No notice of the deletion decision is given to any other network node. If the deleted resource was another network node, all links owned by that resource are deleted at the same time.

While there has been described what is considered to be a preferred embodiment of the present invention, variations and modifications in that embodiment will occur to those skilled in the art once they understand the basic concepts of the invention. Therefore, it is intended that the appended claims shall be construed to include the preferred embodiment and all such variations and modifications as fall within the true spirit and scope of the invention.

We claim:

1. A method of maintaining a topology database at a network node in a communications network, said database comprising individual records defining network resources, said method comprising the steps of:
   monitoring messages received from other network nodes in the network for network resources status updates; and
   removing a record from the topology database where that record defines a resource for which no update message has been received during a predetermined period of time.

2. A method as defined in claim 1 wherein a database record defining a first type of network resource is removed automatically while a database record defining a second type of network resource is removed only if the resource has remained inoperative during the predetermined period of time.

3. In a communications network wherein each network node maintains a topology database defining network resources, said database comprising individual records defining individual resources, said resources being either nodes or communication links, a method by which each network node independently maintains a network topology database comprising the steps of:
   causing each network node to periodically broadcast a topology update measage defining a status of at least one resource in its database;
   causing each network node to monitor topology update messages received from other network nodes;
   causing each network node to remove any node-defining record from its database where that node has not been a subject of a topology update message received from another network node during a predetermined period of time; and
   causing each network node to remove any link-defining record where that link has been a subject of a topology update messages defining the link as being inoperative from another network node during the predetermined period of time.

4. In a communications network wherein each network node maintains a topology database defining network resources, a database comprising individual records, each having a resource identifying field, a resource characteristics fild and a time field, a method of maintaining the topology database, said method being implemented independently at each network node and comprising the steps of:
   assigning an initial value to the time field of a database record when the resource identified by that record is first added to the topology database;
   periodically altering the value of the time field of a database record by a predetermined amount when the record defines a resource of a first type;
   periodically altering the value of the time field of a database record by a predetermined amount only where that record defines a resource of a second type and the resource is characterized as being inoperative;
   reassigning the initial value to the time field for a database record defining a resource of the first type each time a status message for the resource is received from another network node;
   reassigning the initial value to the time field for a database record defining a resource of the second type each time a status message defining the resource as being operative is received from another network node;
   periodically comparing a current value of the time field of each database record to a second predetermined value; and
   removing a record from the database when a current value of the time field for the record equals the second predetermined value.

* * * * *